Dec. 15, 1964

B. HAVERKAMP ETAL 3,161,756

ELECTRICALLY HEATED BILLET-CONTAINERS FOR METAL-EXTRUSION PRESSES

Filed Feb. 5, 1962

INVENTOR

Dec. 15, 1964

B. HAVERKAMP ETAL 3,161,756

ELECTRICALLY HEATED BILLET-CONTAINERS
FOR METAL-EXTRUSION PRESSES

Filed Feb. 5, 1962

INVENTOR

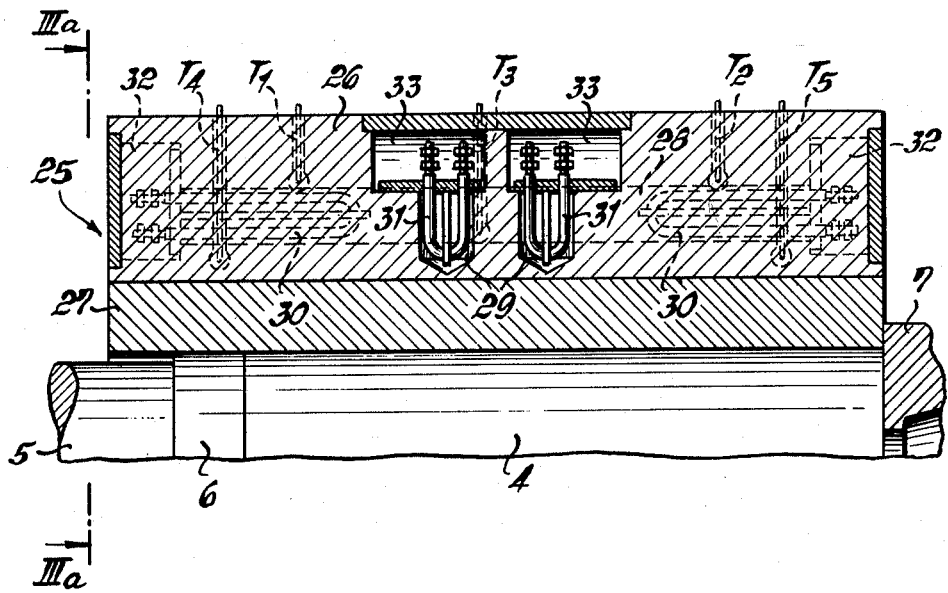
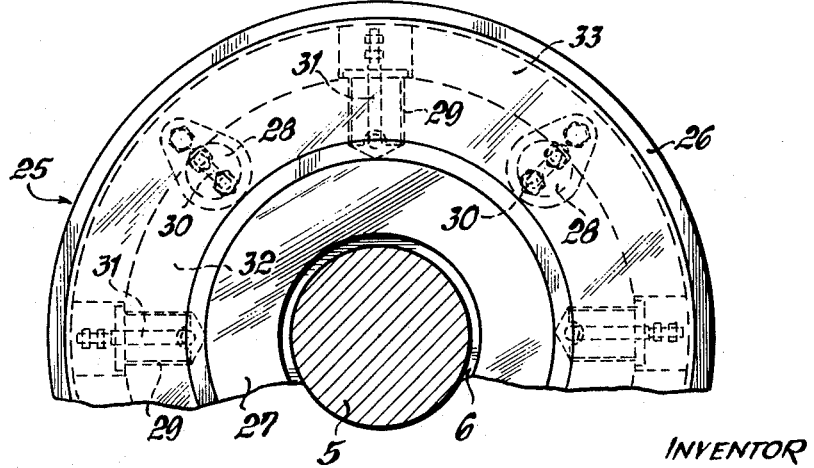

INVENTOR

INVENTOR 3,161,756
ELECTRICALLY HEATED BILLET-CONTAINERS
FOR METAL-EXTRUSION PRESSES
Bernhard Haverkamp, Dusseldorf-Oberkassel, and Horst
Hans Groos, Dusseldorf, Germany, assignors to Schloe-
mann Aktiengesellschaft, Dusseldorf, Germany
Filed Feb. 5, 1962, Ser. No. 170,889
Claims priority, application Germany, Feb. 9, 1961,
Sch 29,215
2 Claims. (Cl. 219—422)

The billet-containers of metal-extrusion presses, in-cluding tube presses, which serve for the hot extrusion of metals, are heated up to the operating temperature, as is known, before the insertion of the billet. During operation it is desirable to maintain this temperature of the billet-receiver, by supplying further heat to cover the losses of heat that occur.

A distinction is drawn between a heating means acting from the exterior and a heating means fitted into the container. An externally acting heating means is in general a gas heating means, or else a radiation heating means fitted into the container-holder.

As internal heating means fitted into the container, electrical induction heating means and electrical resistance heating means are known, which as a rule are arranged in the casing of the container. With induction heating, insulated copper bars are introduced into axially extending cylindrical bores, and are connected with one another by clips on the end faces of the container casing to form a closed winding. The heating bar, through which alternating current flows, produces eddy-current losses in the surrounding solid iron of the container casing, by electromagnetic induction, and these losses are effective as heat. This heat is supplied uniformly over the length of the container.

Resistance heating means is normally likewise lodged in axially extending cylindrical bores. In this case resistance bars are employed which are carried through from one end of the container casing to the other. The heat is generated in the resistance bodies, and is in general transmitted to the casing by contact, more rarely by radiation. By varying the pitch of the coil of the heating winding in the resistance elements, the local distribution of heat in the container can be influenced.

The containers are mostly made in three parts, but frequently in only two parts. The three-part container consists of a casing, an intermediate sleeve and an inner sleeve; the two-part container consists of a casing and an inner sleeve. The sleeves are shrunk into the casing.

The heating acting outwards from the casing annuls the shrinkage connection of the billet-container with the sleeve, as a result of which the flow of heat towards the sleeve is considerably hindered, and the availability of the container is rendered questionable. In this case the sleeve must be additionally heated from the bore outwards by special heating cartridges.

Induction heating requires strong currents at low voltages. For this reason the cross sections of the heating bars, the connections and the leads must be made correspondingly stout. In addition to this, a transformer is required. The low voltages, the strong currents and the transformer involve additional losses. Induction heating therefore has a comparatively low power factor, has high connected load values, since the power falls with increasing temperature, and has in general a single-phase connection. For low-power electrical supply lines a compensating and balancing device is required in addition. Injuries occurring to the windings can mostly be put right only in special workshops. Heating winding, transformer and switch-gear are comparatively costly. Also it is normally not possible to influence the axial distribution of heat in the container. In the centre of the container, that is to say, in the middle of the cylindrical portion of the container, an accumulation of heat occurs, since the end faces give up heat by radiation. The axial distribution of temperature is such that the highest temperature occurs in the middle, and this falls away towards the two ends. Induction heating means can only be lodged in an axial direction, and straight axial bores bring with them higher concentrations of stress in the container casing than radial bores.

Resistance heating of the kind hitherto known admits of a special distribution of heat in the container only by the use of special elements. An accumulation of heat in the centre of the container, that is, in the middle of the cylindrical portion of the container, is here again difficult to avoid. Resistance heating means consist in general of heating cartridges or cartridge-like heating elements. These cartridges have a comparatively low specific surface load capacity, and require to be fitted into the bores since they are to transmit the heat to the container by contact, as a result of which, difficulties occur when dismantling.

The accumulation of heat occurring in the centre of the container, together with the fall of temperature towards the ends associated therewith, leads of course to thermal stresses. These impair the shrinkage stresses in the middle of the casing. By the operative loading the inner sleeves are now subjected in the centre to a higher stress than has been provided for, since the shrinkage stress of the casing is here reduced. In unfavourable cases the over-heating of the central portion of the casing may become so great as to cause permanent deformation, which leads to the so-called bellying of the container. This in its turn involves a relaxation of the shrinkage stress in the centre, and with it an influence, disadvantageous to the sleeves, which may lead so far that the sleeves are ruptured. The entire container is thereby rendered useless.

The problem of the invention is to heat the billet-container by resistance heating in such a way that the fall of temperature hitherto occurring towards the ends is obviated. In addition to this the disadvantages occurring with the known constructions are also to be eliminated. Thus over the entire length of the container a uniform and constant temperature is to be striven after or ensured. Moreover the temperature is to be adaptable to the particular local operative requirements.

The invention consists in the feature that the heating elements are made tubular and hairpin-shaped, and are inserted in the container casing either axially from the ends or else radially, or both axially and radially; that is to say, the heating elements may be arranged either all axially or all radially, but it is also possible to arrange some of them axially and others radially.

A number of heating bodies may be assembled to form one heating element. The surfaces of the walls of the bores should be darkened (by burnishing for example), in order to ensure a better transmission of heat from the heating elements to the container. The lengths of the two heating elements inserted from opposite ends into an axial bore extending through the container casing should be together less than the length of the bore, so that the heating elements extend into substantially only the two outer thirds of the bore.

The heating elements are uniformly distributed over the three phases of an alternating-current network, this being arranged in such a way that the elements of the end faces are each individually connected to one phase, and that the third phase is connected half to heating elements from one end and half to heating elements from the other end. The heating elements may be assembled into groups, to each of which a thermocouple element is allocated (a so-called policing element) as a checking and regulating member. Further thermocouple elements are preferably arranged in the neighborhood of the intermediate sleeve on each end face of the container casing.

Some constructional examples of the invention are illustrated in the accompanying drawings, in which:

FIGURES 1, 2 and 3 each show a billet-container in longitudinal section, with the heating elements arranged in different ways;

FIGURES 1a, 2a and 3a show the billet-containers of FIGURES 1, 2 and 3 respectively in cross section;

Figure 1:
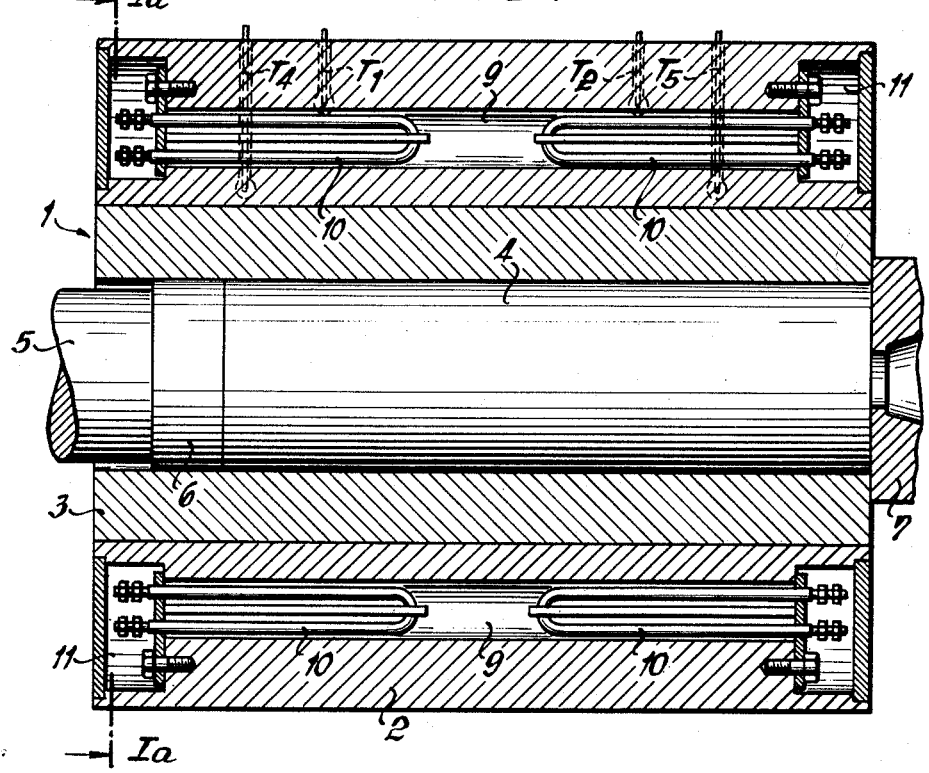
Figure 2:
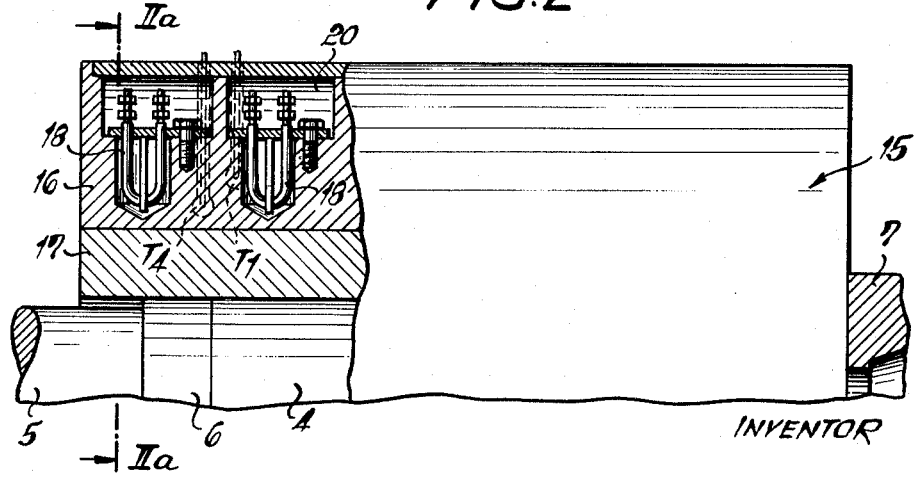
Figure 1A:
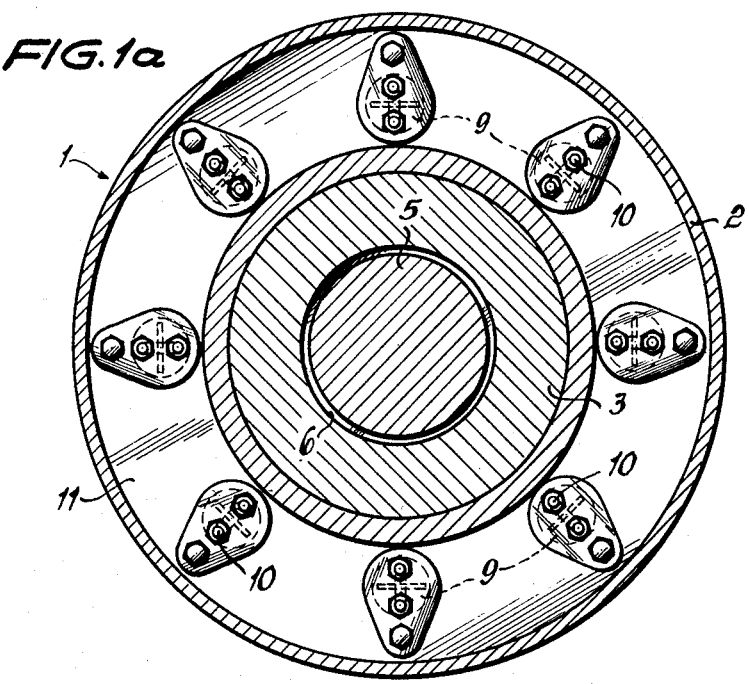
Figure 2A:
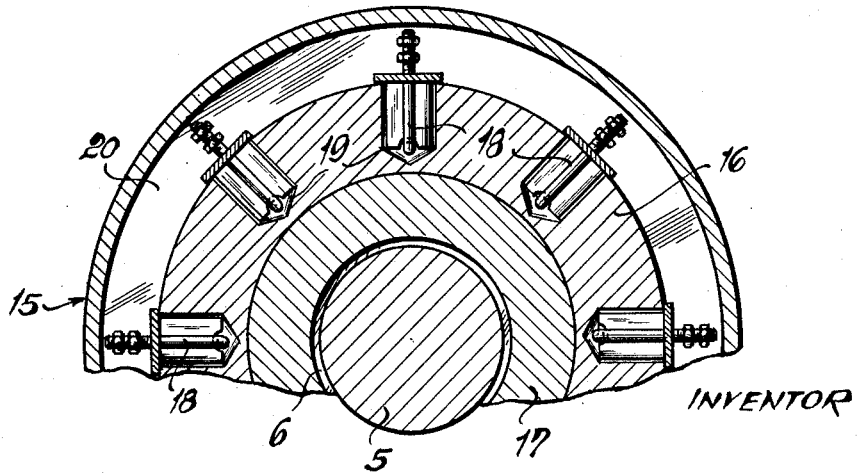
Figure 4A:
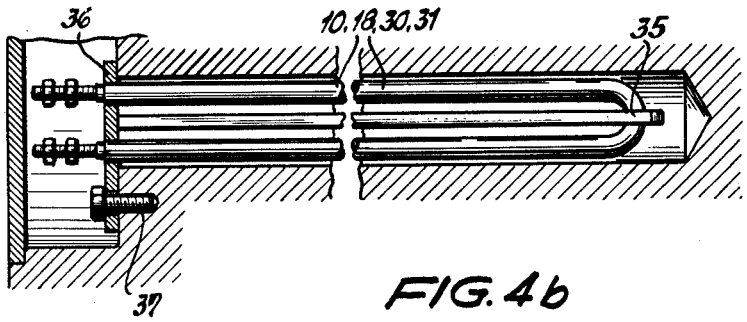
FIGURES 4a and 4b show a heating body in two side views, at right angles to one another.
Figure 4B:
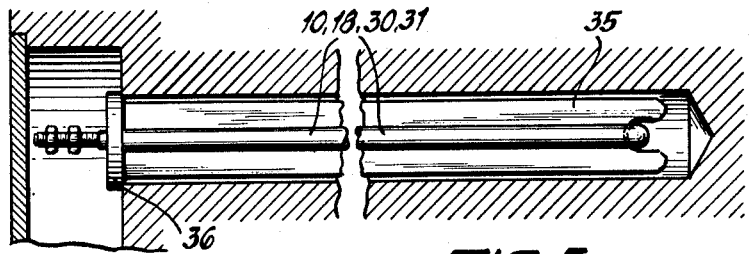

In FIGURE 1, 1 denotes a container of a metal-extrusion and tube press, consisting of a casing 2 and an inner sleeve 3. The casing 2 is shrunk on to the inner sleeve 3. In the inner sleeve is located the billet 4 to be extruded, which, by means of a press ram 5 and a press disc 6 located between the press ram 5 and the billet 4, is extruded through a die 7 to form a profile. In the container casing 2 there are bores 9 which extend parallel to the longitudinal axis of the container 1, and into which heating elements 10 are inserted from both ends. On the end faces of the container 1 there are annular grooves, 11 which are covered externally, and serve for the wiring of the individual heating elements 10. In FIGURES 2 and 2a, as a further constructional example, a container 15 is illustrated, which consists of a container casing 16 and an inner sleeve 17. In the container casing 16 the heating elements 18 are arranged radially around the periphery of the container casing 16 in bores 19. For the wiring of the individual heating elements 18 with one another, groove rings are provided on the periphery, which are covered externally.

In FIGURES 3 and 3a is illustrated a further container 25, which consists of a container casing 26 and an inner sleeve 27. The container casing 26 has bores 28, extending parallel to the longitudinal axis of the press ram 5, and radially arranged bores 29. Into the axially extending bores 28 are inserted, from both ends, heating elements 30, and into the radially arranged bores 29 are inserted heating elements 31. For connecting the heating elements 30 and 31 with one another, grooves 32 and 33 are provided, which are covered on the end faces and along the periphery.

FIGURES 4a, 4b, 5a and 5b show details of the heating elements. The individual heating elements 10 (18, 30, 31) are formed from tubular heating bars bent to a hairpin shape. At right angles to the heating element 10 (18, 30, 31) is arranged a radiation plate 35, of heat-proof alloyed steel, which is to counteract a mutual heating up of the limbs. The radiation plate 35 is secured to a flange 36, which is soldered to the tube walls of the limbs of the heating element with a temperature-proof hard solder. The flange 36 is on the one hand to close the bore, in order to prevent air circulating, and on the other hand to secure the heating body 10 (18, 30, 31) to the container casing by means of a screw connection 37. The heat generated by the heating elements 10, 18, 30, 31 is transmitted to the casing by convection, and, above all, to the walls of the bore, by radiation. To improve the absorption of heat the wall of the bore is darkened by a special treatment, by burnishing for example.

Figure 5A:
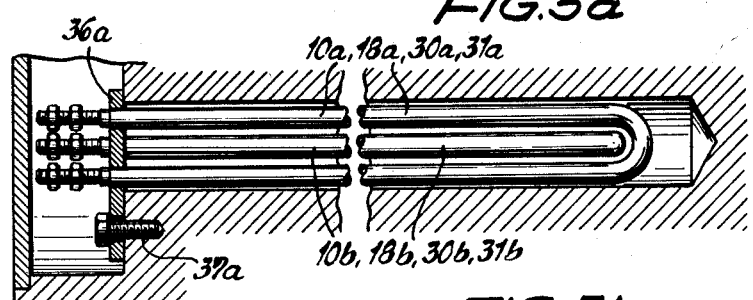
FIGURES 5a and 5b show a further heating body in two side views.
Figure 5B:
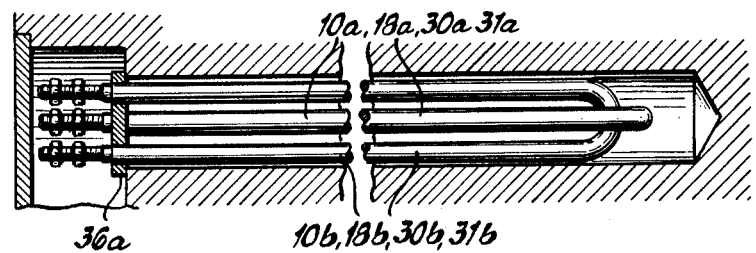

Other heating elements are shown in FIGURES 5a and 5b. In this case two heating bodies 10a, 10b (or 18a, 18b; 30a, 30b; 31a, 31b) are provided, offset by 90° relatively to one another.

Figure 6:
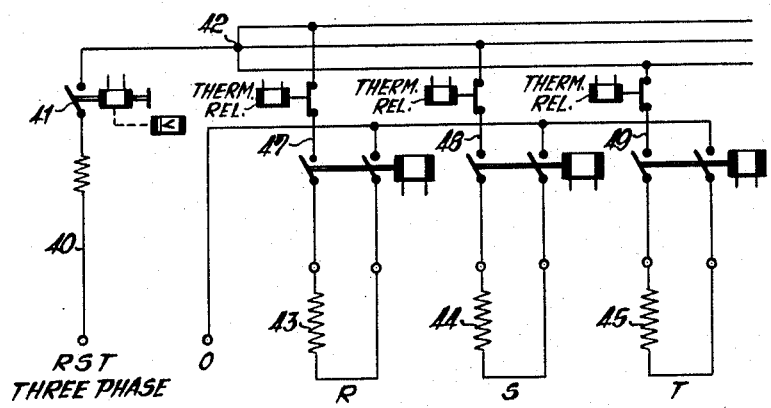
FIGURES 6 and 7 show the connection of individual groups of heating elements to the three phases of a supply network.
Figure 7:
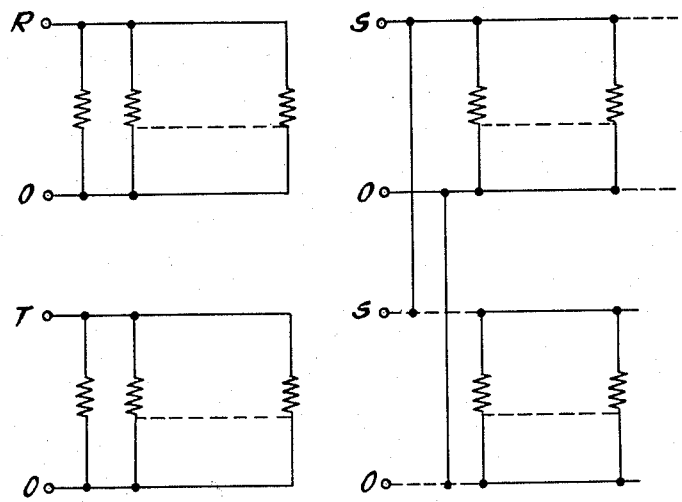

FIGURES 6 and 7 illustrate in basic circuit diagrams the distribution of the individual groups of heating elements amongst the three phases R, S, T. From a three-wire supply line 40 of an electric supply, with a main switch 41, voltage is applied by a star connection 42 to the individual groups of heating elements 43, 44, 45. By 43 is denoted the group of heating elements 18 on one end face of the container 15, by 44 the group of heating elements 18 on the other end face of the container 15, and by 45 the group of heating elements 18 located at the middle of the container. From the star connection 42 a line 47 leads to the group 43, a line 48 to the group 44, and a line 49 to the group 45. The same circuit is also possible for the arrangement of the heating elements 10 illustrated in FIGURE 1, by connecting the majority of the heating elements 10 at one end of the container 1 to the group 43, the majority of the heating elements 10 arranged at the other end of the container 1 to the group 44, and the remainder of the heating elements 10 from both ends to the group 45. The arrangement of the heating elements 30 and 31 illustrated in FIGURE 3 may likewise be distributed amongst the groups 43, 44 and 45 of the star circuit 42.

Figure 8:
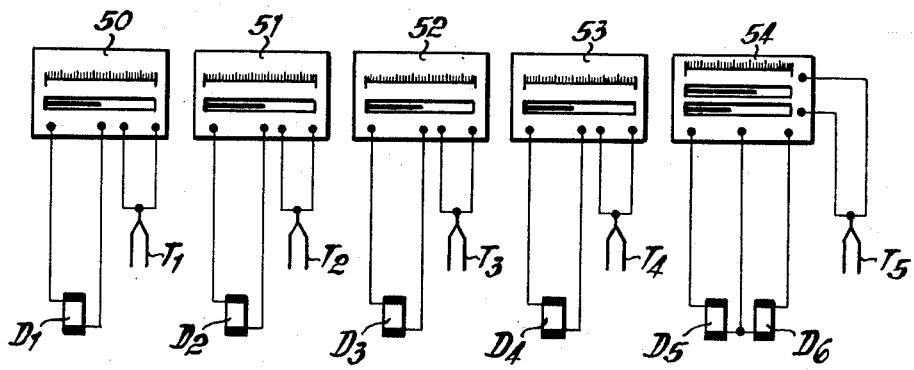
FIGURE 8 shows the connection of thermo-couple elements for three groups of heating elements and of the thermo-couple elements for the end faces of the container casing.
Figure 9:
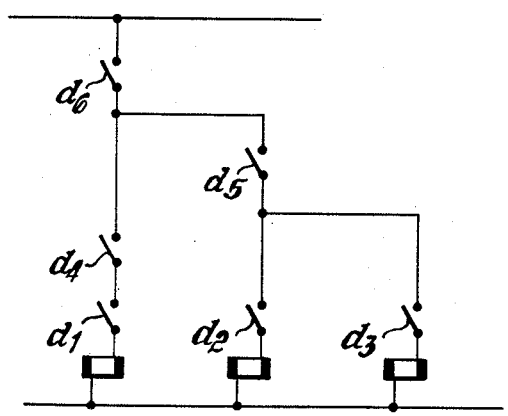
FIGURE 9 shows the control switching of the thermo-couple elements.

FIGURES 8 and 9 represent basic circuit diagrams of the measuring and controlling plant for supervising the temperature of the heating elements 10, 18, 30, 31 and of the container casing 2, 16, 26. The heating elements 10 (18, 30, 31) distributed amongst the three phases R, S and T are controlled by means of the thermo-elements $T_1$, $T_2$, $T_3$ with respect to their surface temperature, that is to say, one of the heating elements of each group, a so-called policing element, is scanned by a thermo-element T1, T2, T3. As soon as the temperature exceeds the adjusted desired value, the associated switching relay D1, D2 or D3 responds. By adjustment on the regulators 50, 52 or 51, it is possible to establish, on each phase R, S, T, the desired temperature value. The temperature of the container is measured in the neighbourhood of the inner sleeve 3, 17 or 27, at the die end and at the ram end of the container 2, 16 or 26. For this the thermo-elements T4 and T5, with the regulators 53 and 54, are employed, T4 being arranged at the ram end and T5 at the die end. Upon the temperature at the measuring point $T_4$ becoming excessive, the switching relay $D_4$ responds, and upon the temperature at the measuring point $T_5$ becoming excessive, the switching relay $D_5$ responds. The corresponding heating circuits are switched off by way of the associated contacts in FIGURE 9. Upon the maximum temperature at the container being reached, the relay D6 switches off the heating as a whole. The measuring points of the thermo-elements are marked in the constructional examples illustrated in FIGURES 1 to 3.

The apparatus according to the invention renders it possible to adjust a difference of temperature between the die end and the ram end of the container, whereby the axial distribution of temperature over the length of the container can easily be adapted to the operative conditions. Thus for example the accumulation of heat at the centre of the container that is characteristic of induction heating can be obviated by supplying more heat to the die end than to the ram end, thus giving rise to a natural temperature gradient in an axial direction. The consumption of energy during operation is thereby reduced, because the positions at which the thermal energy is in fact needed can be given preference in the heating.

The arrangement of the heating elements in radial bores presents the same possibility and the same advantages as the arrangement hereinbefore described in axial bores. In addition, the concentration of mechanical stresses in the container casing with radial bores is more favourable than with axial bores. With the heating elements arranged radially, the bores are located in rings around the casing, and start from an annular groove which accommodates the wiring. The rings of bores are at definite distances from one another, which is dependent upon the number of heating elements to be installed, and upon the desired distribution of heat and the adjustability thereof.

As will already have been gathered from the illustrations of the individual constructional examples, the arrangement of the heating elements according to the invention may be varied, and admits of a number of combinations. The invention is applicable not only to two-part billet-containers, as illustrated, but also to those in three parts.

What we claim is:

1. A billet-container equipped with resistance heating means for a metal-extrusion press, the billet-container comprising a casing formed with bores extending through the container casing parallel to its axis and also with bores extending radially into the container casing from its periphery, and the heating means consisting of hairpin-shaped tubular electrical-resistance heating elements arranged in said bores, some inserted into the longitudinal bores from both ends of the casing and others inserted inwardly into the radial bores.

2. A billet-container equipped with resistance heating means for a metal-extrusion press, comprising: a casing formed with bores, heating means consisting of hairpin-shaped tubular electrical-resistance heating elements arranged in said bores, and a plane radiation plate arranged between the two limbs of each of the hairpin-shaped heating elements and making an angle with the plane containing the two limbs of the element.

References Cited by the Examiner

UNITED STATES PATENTS

| | | | |
|---|---|---|---|
| 1,535,608 | 4/25 | Johnson | 219—243 X |
| 2,057,124 | 10/36 | Van Gessel et al. | 313—340 |
| 2,310,325 | 2/43 | Smitch | 219—523 X |
| 2,338,518 | 1/44 | Koch | 219—209 X |
| 2,367,451 | 1/45 | West | 219—201 X |
| 2,508,988 | 5/50 | Bradley | 165—30 |
| 2,674,373 | 4/54 | Latin | 207—15 |
| 2,700,094 | 1/55 | Hosack | 219—323 X |
| 2,820,132 | 1/58 | Krause | 219—424 X |
| 2,853,590 | 9/58 | Zandel et al. | 219—424 X |
| 2,917,616 | 12/59 | Thomson | 219—354 X |
| 2,992,314 | 7/61 | Drugmand et al. | 219—549 X |
| 3,028,476 | 4/62 | Hug | 219—201 X |
| 3,043,128 | 7/62 | Ayers | 219—280 X |
| 3,060,302 | 10/62 | Maccaferri | 219—201 X |
| 3,042,195 | 7/62 | Muller | 207—15 |

FOREIGN PATENTS 245,937  12/46  Switzerland.

RICHARD M. WOOD, *Primary Examiner.*

MAX L. LEVY, *Examiner.*